(12) United States Patent
Potyrailo et al.

(10) Patent No.: US 11,567,022 B2
(45) Date of Patent: Jan. 31, 2023

(54) SENSING SYSTEM AND METHOD

(71) Applicant: General Electric Company, Schenectady, NY (US)

(72) Inventors: Radislav Alexandrovich Potyrailo, Niskayuna, NY (US); Richard St. Pierre, Clifton PArk, NY (US); Bruce Courtney Amm, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 910 days.

(21) Appl. No.: 16/432,013

(22) Filed: Jun. 5, 2019

(65) Prior Publication Data
US 2020/0386701 A1 Dec. 10, 2020

(51) Int. Cl.
*G01N 27/12* (2006.01)

(52) U.S. Cl.
CPC ......... *G01N 27/122* (2013.01); *G01N 27/123* (2013.01); *G01N 27/124* (2013.01)

(58) Field of Classification Search
CPC .............. G01N 27/122; G01N 27/123; G01N 27/124
See application file for complete search history.

(56) References Cited

U.S. PATENT DOCUMENTS

| 5,570,179 | A | 10/1996 | Weckstrom |
| 7,287,412 | B2 | 10/2007 | Ng |
| 8,449,824 | B2 | 5/2013 | Sun |
| 2010/0166614 | A1 | 7/2010 | Uchiyama |
| 2019/0234895 | A1* | 8/2019 | Smilanich ............ G01N 27/123 |

FOREIGN PATENT DOCUMENTS

CN 101793821 8/2010

OTHER PUBLICATIONS

Jin-Chern Chiou, "Development of Micro-hotplate with TaN Heater Based Cu-doped SnO2 Gas Sensor for Low Concentration of H2S Gas", Sensors, 2013 IEEE, Nov. 2013, pp. 1-4.

* cited by examiner

Primary Examiner — Paul M. West
(74) Attorney, Agent, or Firm — Fletcher Yoder, P.C.

(57) ABSTRACT

A sensor system includes a sensing element that includes a sensing material and electrodes configured to apply a first electrical stimuli to the sensing material at an electrical excitation frequency, a modifier assembly including one or more circuits configured to change an electrical impedance of the sensing element, and one or more processors configured to control the modifier assembly. Responsive to exposure of gas to the sensing element, the one or more processors change a linearity of a first electrical signal received from the sensing element by changing the electrical impedance of the sensing element and applying a second electrical stimuli to the sensing material at the electrical excitation frequency.

20 Claims, 10 Drawing Sheets

US 11,567,022 B2

SENSING SYSTEM AND METHOD

FIELD

One or more embodiments are disclosed that relate to systems and methods for sensing gases.

BACKGROUND

Gas sensors are based on sensing materials that include metal oxide semiconductors (MOS) materials, dielectric polymers, conducting polymers, nanotubes, metal organic frameworks, graphene, supramolecular compounds, and some others. Often, sensors demonstrate saturation of their response at high concentrations leading to false readings.

Conventional sensors have relatively narrow dynamic range of measurements due to the nature of the interaction mechanisms of sensing materials with the ambient environment. For example, while MOS materials have the biggest commercial success because of their broad applications for gas alarms in residential and industrial facilities, the readout of MOS materials is conventionally performed by measuring resistance change of the material as a function of gas concentration. Such relation follows a well-known power law with a saturation of sensor response at high concentrations.

BRIEF DESCRIPTION

In one or more embodiments, a sensor system includes a sensing element that includes a sensing material and electrodes configured to apply a first electrical stimuli to the sensing material at an electrical excitation frequency, a modifier assembly including one or more circuits configured to change an electrical impedance of the sensing element, and one or more processors configured to control the modifier assembly. Responsive to exposure of gas to the sensing element, the one or more processors change a linearity of a first electrical signal received from the sensing element by changing the electrical impedance of the sensing element and applying a second electrical stimuli to the sensing material at the electrical excitation frequency.

In another embodiment, a method includes applying a first electrical stimuli at an electrical excitation frequency to a sensing material of a sensing element via electrodes. A first electrical signal is received from the sensing element that is representative of a resistance of the sensing material during exposure of the sensing material to the first electrical stimuli. A linearity of the first electrical signal received from the sensing element is changed by changing an electrical impedance of the sensing element and applying a second electrical stimuli at the electrical excitation frequency to the sensing material.

In another embodiment, a method includes applying electrical stimuli at a single electrical excitation frequency to a sensing material of a sensing element via electrodes. A first electrical signal is received from the sensing element that is representative of a resistance response of the sensing material during exposure of the sensing material to the electrical stimuli. A second electrical signal is received from the sensing element that is representative of an impedance response of the sensing material at the single electrical excitation frequency. A linearity of the first electrical signal received from the sensing element changes by changing a configuration of a modifier assembly of the sensing element to change an impedance of the sensing element based on one or more of the impedance response of the sensing material or the resistance response of the sensing material.

In another embodiment, a method includes applying electrical stimuli at two or more electrical excitation frequencies to a sensing material of a sensing element via electrodes. Electrical signals are received from the sensing element during exposure of the sensing material to the electrical stimuli. A first electrical signal is representative of a resistance response of the sensing material during exposure of the sensing material to the electrical excitation frequencies, and a second electrical signal is representative of an impedance response of the sensing material during exposure of the sensing material to the electrical excitation frequencies. A linearity of one or more of the electrical signals received from the sensing element is changed by changing a configuration of a modifier assembly of the sensing element to change an impedance of the sensing element based on one or more of the resistance response of the sensing material or the impedance response of the sensing material.

DETAILED DESCRIPTION

Figure 1:
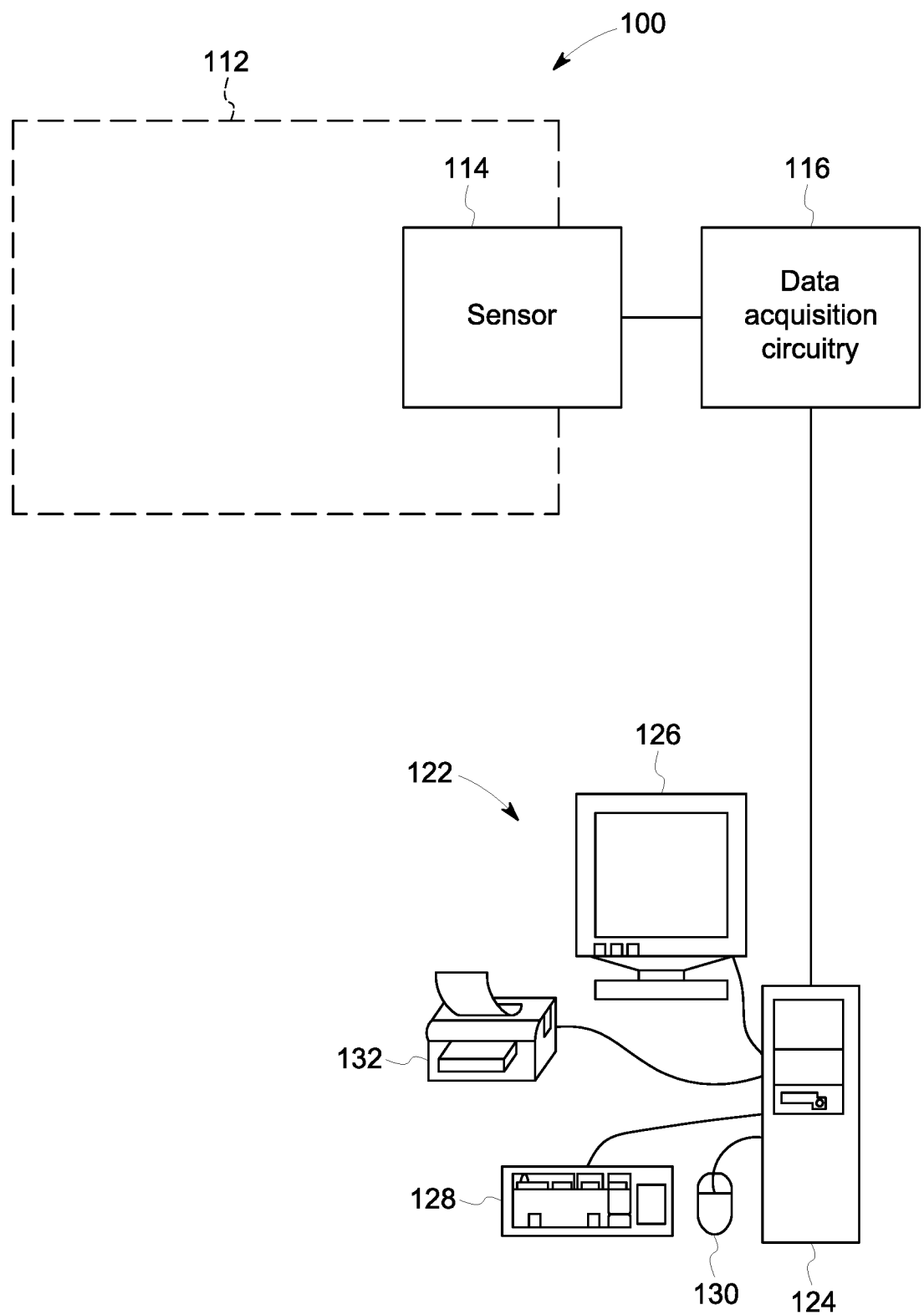
FIG. 1 illustrates one embodiment of a sensor system in accordance with one embodiment.

One or more embodiments of the inventive subject matter described herein provide sensing systems and methods that provide reconfiguration of sensitivity and dynamic range of gas measurements. The systems and methods apply electrical stimuli at a single excitation frequency to a sensing material via sensing electrodes. Responsive to exposure of gas to a sensing element of the sensor, one or more processors change a linearity of a first electrical signal by changing the electrical impedance of the sensing element with a modifier assembly. A second electrical stimuli is applied to the sensing material at the same single excitation frequency. A linearity of the electrical signal is changed by changing the impedance of the sensing element of the sensor.

In one or more embodiments of the inventive subject matter described herein, the sensing material is a metal oxide, an inorganic material, a composite material, an organic material, a polymeric material, a nanomaterial, or the like. Conventional resistance measurements can suffer from non-linear responses as a function of gas concentration because resistance responses follow a power law with a saturation of sensor response at high or increased concentration values. For example, such power law response is known to be observed when using metal oxide sensing materials. As a result, high gas concentrations saturate sensor responses, leading to underestimate of gas concentrations. The sensor systems and methods described herein improve a sensitivity of the sensor to high or increased concentration values of the analyte of interest without changing an excitation frequency of electrical stimuli applied to the sensing material. These sensing systems and methods provide a low cost, sensing method and system with increased sensitivity and a dynamic range of gas concentrations. Relevant features of multivariable sensing include linearity, ability to detect relatively low gas concentrations, and ability to detect relatively high gas concentrations.

At least one technical effect of the various embodiments herein can reconfigure a sensitivity and dynamic range of gas measurements using gas sensors based on diverse types of sensing materials. Electrical stimuli may be applied to a sensing material at a single excitation frequency. Based on resistance responses across a spectrum of concentrations of an analyte of interest, the system changes an impedance of the sensing element of the sensor while the frequency of the electrical stimuli remains substantially constant or unchanged. Changing the impedance of the sensing element changes a linearity of the resistance responses of the electrical signals and increases a sensitivity of the sensor at different concentrations of the analyte of interest. As an additional technical effect, the discovery of reconfiguration of the sensitivity is an ability to perform measurements at low, medium, and/or high concentrations of gases at approximately or substantially similar sensitivity while applying electrical stimuli to the sensing material at a single frequency. Another technical effect for reconfiguration of dynamic range of measurements (e.g., a range of gas concentrations over which the sensor provides accurate readings) is the ability to measure a broad range of concentrations with a single sensor or single sensing element.

FIG. 1 illustrates one embodiment of a sensor system 100. The system 100 examines a fluid in contact with the system 100. The fluid may be a gas, a liquid, a gas-liquid mixture, a solid, particles or particulate matter, or the like, containing one or more analyte gases therein. The fluid may be transformer oil or any insulating fluid of an electrical transformer that is installed and/or disposed of below a ground level, above the ground level, near to the ground level, or any other position. In another embodiment, the fluid may be a gas or fuel, such as a hydrocarbon-based fuel. One example of the fluid is natural gas that is supplied to a powered system (e.g., a vehicle, or a stationary generator set) for consumption. Other examples of such a fluid can include gasoline, diesel fuel, jet fuel or kerosene, bio-fuels, petrodiesel-biodiesel fuel blends, natural gas (liquid or compressed), and fuel oils. Another example of the fluid is indoor or outdoor ambient air. Another example of the fluid is air at an industrial, residential, military, construction, urban, and any other known site. Another example of the fluid is ambient air with relatively small concentrations of hydrocarbons and/or other pollutants. Another example of the fluid is at least one gas dissolved in an industrial liquid such as transformer oil, bioprocess media, fermentation media, wastewater, and any other. Another example of the fluid is the at least one gas dissolved in a consumer liquid such as milk, non-alcoholic beverages, alcoholic beverages, cosmetics, and any other. Another example of the fluid is at least one gas dissolved in a body liquid such as blood, sweat, tears, saliva, urine, and any other.

The system 100 may include a fluid reservoir 112 for holding the fluid and one multivariable gas sensor 114 at least partially disposed in, on, or within the fluid reservoir 112. Alternatively, the sensor 114 may be set in a flow path of the fluid outside of the reservoir 112, such as coupled to in-line connectors in fluid communication with the fluid reservoir that define a flow path. The multivariable gas sensor 114 may be a sensor with at least two or more outputs that are substantially independent of each other output. The fluid reservoir 112 may be in a form of a vessel with controlled volume or in a form of an open area such as an indoor facility (e.g., a room, a hall, a house, a school, a hospital, a confined space, or the like), or in the form of an outdoor facility (e.g., a stadium, a gas-production site, a seashore, a forest, or the like). In one embodiment, the sensor 114 may provide continuous monitoring of the fluid within the reservoir or flow path. In one or more embodiments, the sensor 114 may be an impedance gas sensor, an electromagnetic sensor, a photonic sensor, an electronic sensor, a hybrid sensor, or another type of sensor. Optionally, the multivariable gas sensor may be a sensor array.

The sensor 114 may detect characteristics or properties of the fluid via a resonant or non-resonant impedance spectral response. One or more of the inductor-capacitor-resistor resonant circuits (LCR resonators) may measure the resonant impedance spectral response of the sensor. A non-resonant impedance spectral response is measured when the circuit does not contain an inductor. The resonant or non-resonant impedance spectrum of the sensor 114 in proximity to the fluid varies based on sample composition and/or components and/or temperature. The measured resonant or non-resonant impedance values Z' (which may be the real part of impedance, Zre) and Z" (which may be the imaginary part of impedance, Zim) reflect the response of the sensor 114 to the fluid.

Other embodiments of the inventive subject matter described herein include other designs of sensors besides resonant and non-resonant impedance sensors. Other sensors can be capacitor sensors, electro-mechanical resonator sensors (e.g., tuning forks, cantilever sensors, acoustic device sensors), thermal sensors, optical sensors, acoustic sensors, photoacoustic sensors, near-infrared sensors, ultraviolet sensors, infrared sensors, visible light sensors, fiber-optic sensors, reflection sensors, multivariable sensors, or single-output sensors. The sensor may generate electrical or optical stimuli in response to measured gas in ambient air at an industrial, residential, military, construction, urban, and any other known site or in measured gas in transformer oil or in isolating fluid. The insulating fluid of an electrical transformer may be insulating oil, mineral oil, synthetic oil, vegetable oil, and any other appropriate insulating fluid.

An electrical field may be applied to a sensing material or sensing film of the sensor 114 via electrodes. The distance between the electrodes and the electrodes geometry as well as the applied periodic voltage to the electrodes, may define the magnitude of the electric field applied to the sensor 114 (e.g., to the sensing material or film). The electrodes may be in direct contact with the sensing material. For example, the sensor 114 may be a combination of a sensing region and associated circuits and/or the sensing region may be coated with the sensing material. The sensing material may be semiconductor material or metal oxide material.

Suitable sensors may include single use or multi-use sensors. A suitable multi-use sensor may be a re-usable sensor that may be used during the lifetime of a system in which it may be incorporated into. In one embodiment, the sensor may be a single use sensor that may be used during all or part of a reaction or process.

Data from the sensor 114 may be acquired via data acquisition circuitry 116, which may be associated with the sensor or which may be associated with a control system, such as a controller or workstation 122 including data processing circuitry, where additional processing and analysis may be performed. The controller or workstation 122 may include one or more wireless or wired components, and may also communicate with the other components of the system 100. Suitable communication models include wireless or wired. At least one suitable wireless model includes radio frequency devices, such as radio frequency identification (RFID) wireless communications. Other wireless communication modalities may be used based on application specific parameters. Nonlimiting examples include Bluetooth, Wi-Fi, 3G, 4G, 5G, and others. For example, where there may be electromagnetic field (EMF) interference, certain modalities may work where others may not. The data acquisition circuitry 116 optionally can be disposed within the sensor 114. Other suitable locations may include disposition being within the workstation 122. Further, the workstation 122 can be replaced with a control system of the whole process where the sensor and its data acquisition circuitry may be connected to the control system of process.

The data acquisition circuitry 116 may be in the form of a sensor reader, which may be configured to communicate wirelessly or wired with the fluid reservoir 112 and/or the workstation 122. For example, the sensor reader may be a battery-operated device and/or may be powered using energy available from the main control system or by using harvesting of energy from ambient sources (light, vibration, heat, or electromagnetic energy).

Additionally, the data acquisition circuitry may receive data from one or more sensors 114 (e.g., multiple sensors positioned at different locations in or around the fluid reservoir). The data may be stored in short term and/or long term memory storage devices, such as archiving communication systems, which may be located within or remote from the system and/or reconstructed and displayed for an operator, such as at the operator workstation. The sensors 114 may be positioned on or in oil fluid reservoirs, associated piping components, connectors, flow-through components, and any other relevant process components. The data acquisition circuitry 116 may include one or more processors for analyzing the data received from the sensor 114. For example, the one or more processors may be one or more computer processors, controllers (e.g., microcontrollers), or other logic-based devices that perform operations based on one or more sets of instructions (e.g., software). The instructions on which the one or more processors operate may be stored on a tangible and non-transitory computer readable storage medium, such as a memory device. The memory device may include a hard drive, a flash drive, RAM, ROM, EEPROM, and/or the like. Alternatively, one or more of the sets of instructions that direct operations of the one or more processors may be hard-wired into the logic of the one or more processors, such as by being hard-wired logic formed and/or stored in the hardware of the one or more processors.

In addition to displaying the data, the operator workstation 122 may control the above-described operations and functions of the system 100. The operator workstation 122 may include one or more processor-based components, such as general purpose or application-specific computers or processors 124. In addition to the processor-based components, the computer may include various memory and/or storage components including magnetic and optical mass storage devices, internal memory, such as RAM chips. The memory and/or storage components may be used for storing programs and routines for performing the techniques described herein that may be executed by the operator workstation 122 or by associated components of the system 100. Alternatively, the programs and routines may be stored on a computer accessible storage and/or memory remote from the operator workstation 122 but accessible by network and/or communication interfaces present on the computer 124. The computer 124 may also comprise various input/output (I/O) interfaces, as well as various network or communication interfaces. The various I/O interfaces may allow communication with user interface devices, such as a display 126, keyboard 128, electronic mouse 130, and printer 132, that may be used for viewing and inputting configuration information and/or for operating the imaging system. Other devices, not shown, may be useful for interfacing, such as touchpads, heads up displays, microphones, and the like. The various network and communication interfaces may allow connection to both local and wide area intranets and storage networks as well as the Internet. The various I/O and communication interfaces may utilize wires, lines, or suitable wireless interfaces, as appropriate or desired.

Figure 2:
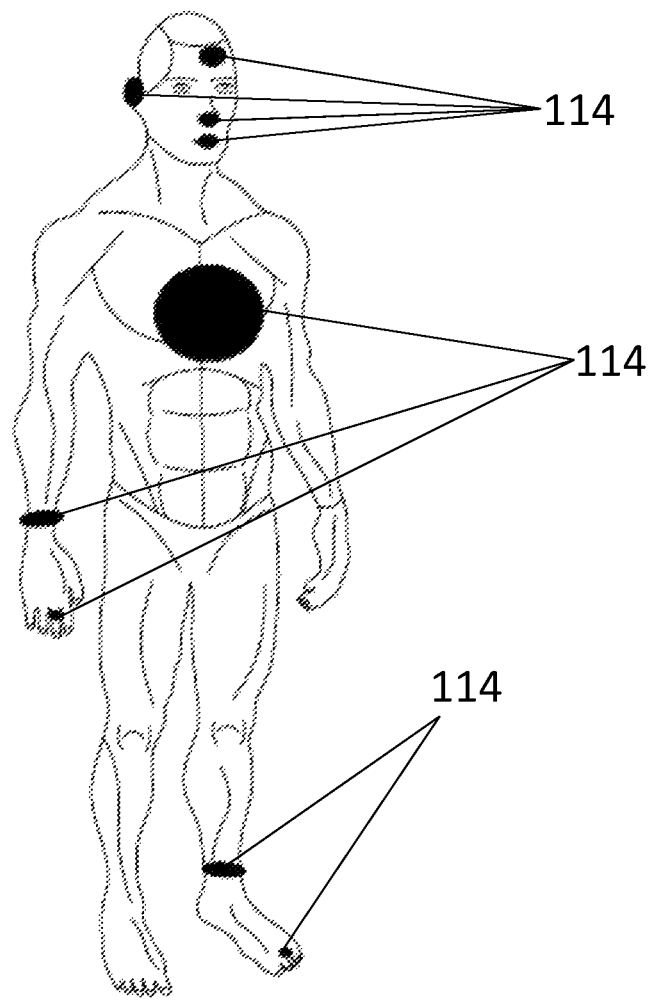
FIG. 2 illustrates exemplary positions of a wearable sensor system in accordance with one embodiment.

In one or more embodiments, the sensor system 100 may be a wearable sensor system, may be held within a wearable and/or non-wearable transferable object (e.g., a frame of military or industrial eyeglasses), or the like. The wearable device may be worn by a subject, such as a human or animal, may be removably coupled or integrated with an article worn by a subject (e.g., a shirt, pants, safety vest, safety personal protection clothing, eyeglasses, hat, helmet, hearing device, or the like), or may be any alternative device that may be transferable such that sensor can be moved between different positions, may be stationary or substantially stationary, or the like. FIG. 2 illustrates exemplary positions of different wearable sensors 114. In the illustrated embodiment of FIG. 2, the subject is a human subject, however the subject may be a mammal subject, a plant subject, or the like.

Figure 3:
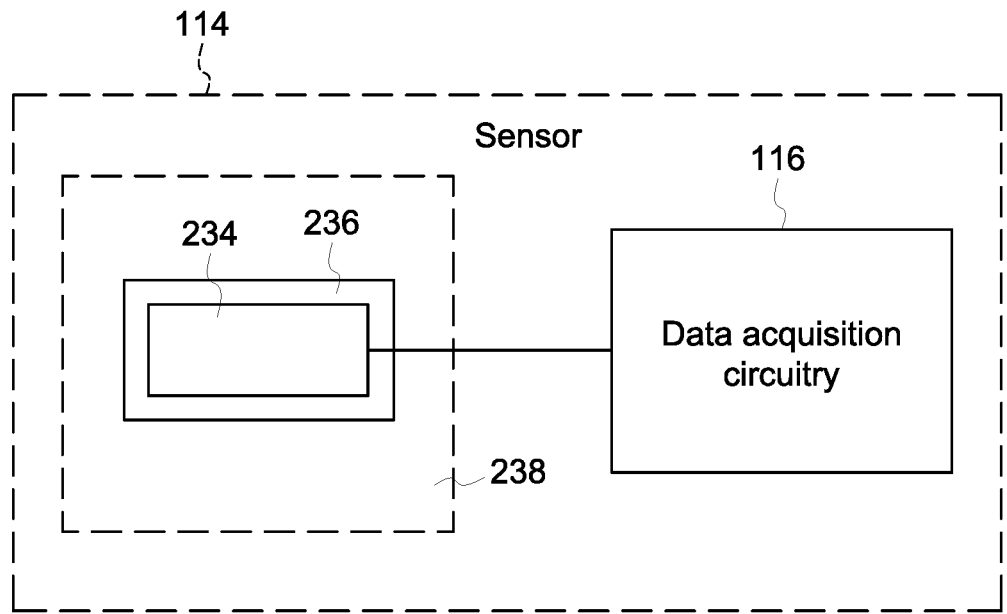
FIG. 3 illustrates a non-limiting example of a design of a sensor shown in FIG. 1 in accordance with one embodiment.

FIG. 3 illustrates a non-limiting example of a design of the sensor 114. A sensing electrode structure 234 of the sensor 114 may be connected to the data acquisition circuitry 116. The sensing electrode structure 234 can be coated with a sensing film 236. The sensing electrode structure 234, with the sensing film 236, forms a sensing region circuit 238. The sensing electrode structure 234, with the sensing film 236 that forms the sensing region circuit 238, may operationally contact a fluid. The fluid contains the one or more analyte gases therein.

Suitable interdigital electrode structures for probing a fluid sample include two- and four-electrode structures. Suitable materials for electrodes include stainless steel, platinum, gold, noble metals, and others. Suitable materials of a substrate may include silicon dioxide, silicon nitride, alumina, ceramics, and others. Suitable examples of sensing materials or sensing films include a metal oxide material, a composite material, semiconducting materials, n-type semiconducting materials, p-type semiconducting materials, nanocomposite materials, inorganic materials, organic materials, polymeric materials, formulated materials, any known sensing material, or the like. Suitable electrodes may be formed using metal etching, screen-printing, ink-jet-printing, and mask-based metal deposition techniques. The thickness of fabricated electrodes on the substrates may be in the range from about 10 nanometers to about 1000 micrometers. The materials for the interdigital electrode structures, substrate, sensing layer, and electrode formation methods may be selected based at least in part on the application specific parameters.

Figure 4:
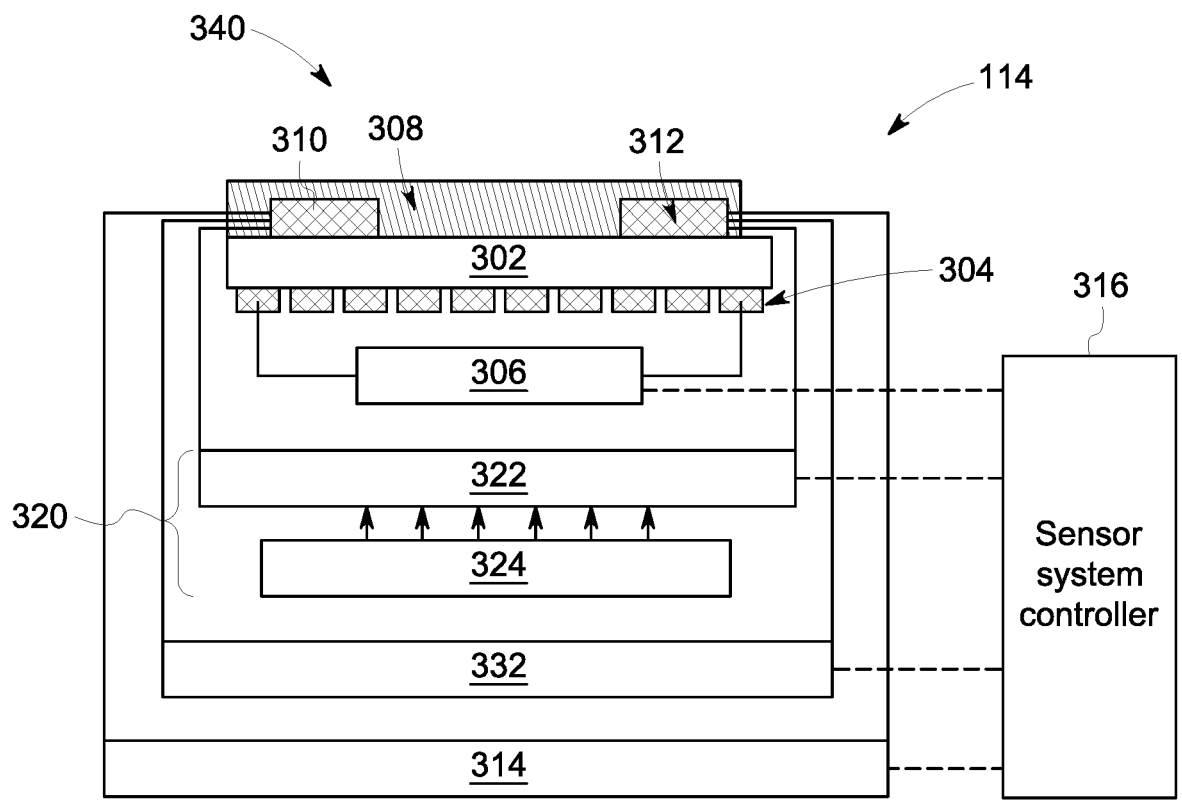
FIG. 4 illustrates one embodiment of a sensor in accordance with one embodiment.

FIG. 4 illustrates one embodiment of the multivariable gas sensor 114. The sensor 114 may represent another version of the sensors or sensing systems described herein. The sensor 114 includes a sensing element 340 having a substrate 302, such as a dielectric material, a sensing film or sensing material 308 that is coupled to the substrate 302, and electrodes 310, 312. The sensing material 308 is exposed to, in contact with, in indirect contact with, or the like, at least one analyte gas. One or several heating elements 304, such as high resistance bodies, are coupled to a different side of the substrate 302 relative to the sensing material 308. The heating elements 304 receive electric current from a heater controller 306, which represents hardware circuitry that conducts the heater current or voltage to the heating elements 304 to heat the substrate 302 and to heat the sensing film or sensing material 308 that is coupled to another side of the substrate 302. For example, in one or more embodiments of the inventive subject matter described herein, the sensing material 308 utilizes a metal oxide sensing film. The sensing material 308 can include one or more materials deposited onto the substrate 302 to perform a function of predictably and reproducibly affecting the impedance sensor response upon interaction with the environment. For example, a metal oxide, such as $SnO_2$, may be deposited as the sensing material 308.

The sensing electrodes 310, 312 are coupled with and/or disposed in the sensing material 308 and are connected with the substrate 302 in the illustrated embodiment. The sensing electrodes 310, 312 are conductive bodies that are conductively coupled with one or more of a modifier assembly 320, an impedance system 314, and a resistance detector system 332. In the illustrated embodiment, the sensing electrodes 310, 312 are directly and independently conductively coupled with each of the modifier assembly 320, the impedance system 314, and the resistance detector system 332, but may alternatively not be conductively coupled with one of the systems or assembly 320, 314, 332. Optionally, the sensing electrodes 310, 312 may be directly or indirectly conductively coupled with one or more of the modifier assembly 320, the impedance system 314, or the resistance detector system 332. Each of the modifier assembly 320, the impedance system 314 and the resistance detector system 332 having one or more processors that include one or more microprocessors, field programmable gate arrays, and/or integrated circuits.

In one or more embodiments, the sensing electrodes 310, 312 may be coated with a sensing material that is responsive to one or more analyte gases of interest. The one or more processors of the impedance system 314 also direct the sensing electrodes 310, 312 to apply the electrical stimuli at one frequency, such as an electrical excitation frequency or a single excitation frequency. The one or more processors of the impedance system 314 may also receive an electrical signal from the sensing electrodes 310, 312 that represents the electrical impedance or impedance response of the sensing element 340 during exposure of the sensing material 308 to the fluid sample. In alternative embodiments, the impedance system 314 may be referred to as a frequency impedance source and detector system. The impedance system 314 examines the electrical impedance of the sensing element 340 in order to determine the presence and/or amount (e.g., concentration) of one or more analyte gases in the environment to which the sensing material 308 is exposed, as described herein. The impedance system 314 may provide scanning capability to measure sensor impedance responses at a single or at plural discrete frequencies. Alternatively, the impedance system 314 may provide capability to measure sensor impedance responses across a frequency range.

In one or more embodiments, the one or more processors of the resistance detector system 332 receives an electrical signal from the sensing electrodes 310, 312 that represents a resistance or a resistance response of the sensing material 308 during exposure of the sensing material 308 to the fluid sample. The resistance detector system 332 examines the resistance response of the sensing material 308 in order to determine the presence and/or amount (e.g., concentration) of one or more analyte gases in the environment in which the sensing material 308 is exposed. In alternative embodiments, the impedance system 314 and the resistance detector system 332 may be disposed within a common housing, may include common and/or unique integrated circuits and/or circuitry that allows the system to operate as either an impedance system or a resistance detector system, or any combination therein.

Figure 5:
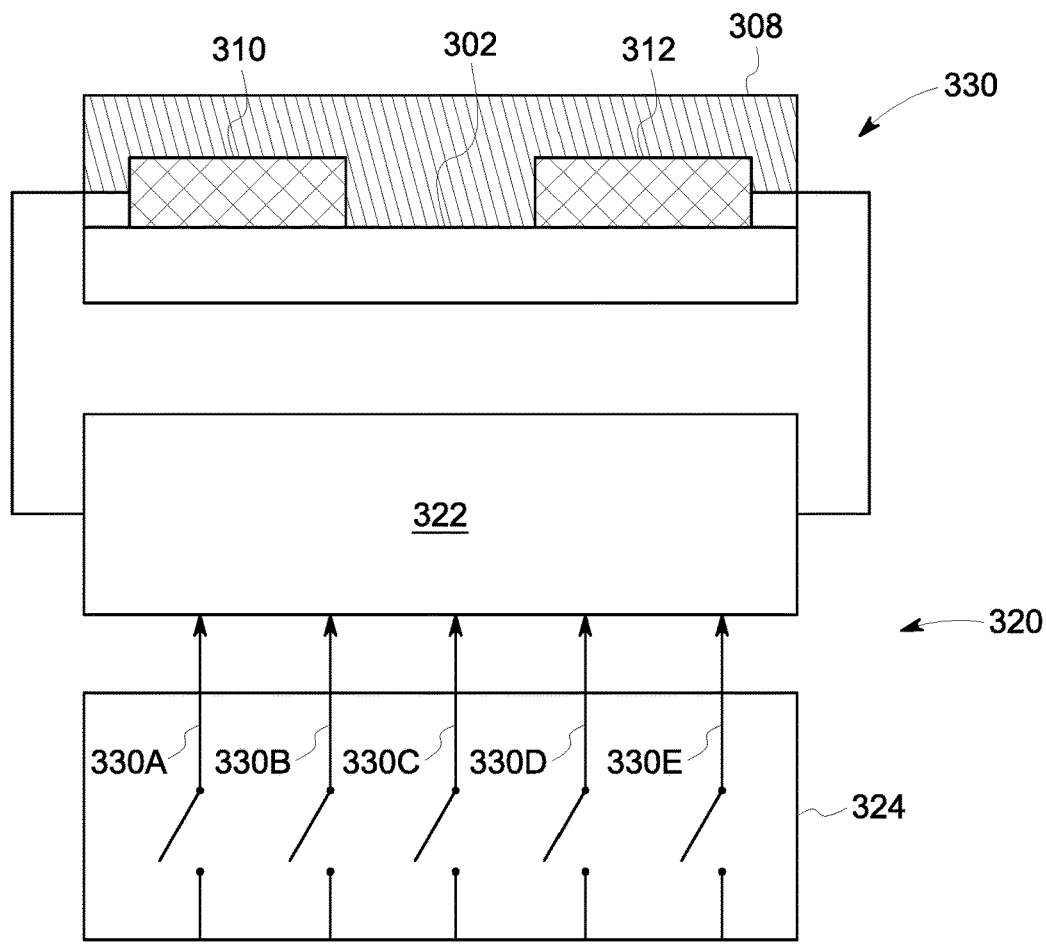
FIG. 5 illustrates a modifier assembly in accordance with one embodiment.

The modifier assembly 320 includes a bank of circuits 324 and may optionally include a multiplexer 322 coupled with the bank of circuits 324. FIG. 5 illustrates the modifier assembly 320 in accordance with one embodiment. The bank of circuits 324 includes plural circuits 330A-E that may each include one or more passive electrical components. In the illustrated embodiment, the bank of circuits 324 includes five circuits 330A-E, and each of the plural circuits 330A-E are shown as individual circuits. Alternatively, the bank of circuits 324 may include any number of circuits 330, the circuits 330 may have any alternative configuration, or the like. Each of the circuits 330A-E are conductively coupled with the multiplexer 322. The multiplexer 322 combines the plural signals received from each of the circuits 330A-E and combines the signals into a single output that is directed to the sensing electrodes 310, 312.

Returning to FIG. 4, a sensor system controller 316 is operably coupled with the impedance system 314, the resistance detector system 332, the modifier assembly 320, and the heater controller 306. The sensor system controller 316 includes one or more processors that include one or more microprocessors, field programmable gate arrays, and/or integrated circuits. The sensor system controller 316 controls the modifier assembly 320 to apply the electrical stimuli at a single or discrete impedance, or at a predetermined range of varying impedance, for interrogation of the sensing material or sensing film 308 and what integration time to apply to measure the sensor response at each frequency.

The sensor system controller 316 directs one or more of the plural circuits 330A-E to open and/or close to change the impedance of the electrical stimuli applied to the sensing material 308. Opening each of the circuits 330 electrically disconnects each of the circuits from the multiplexer 322 and from the sensing electrodes 310, 312. Closing the circuits 330 electrically connects or electrically couples the circuits with the multiplexer 322 and with the sensing electrodes 310, 312. The modifier assembly 320 changes the impedance of the sensing element 340 without changing the electrical excitation frequency of the electrical stimuli applied to the sensing electrodes 310, 312 via the impedance system 314. In one embodiment, the sensor system controller 316 may direct a first circuit 330A to close and direct the remaining circuits 330B-E to open to apply the electrical stimuli having a first impedance to the sensing material 308. Optionally, the sensor system controller 316 may direct a second circuit 330B to close and direct the remaining circuits 330A, 330C-E to open to apply the electrical stimuli having a different, second impedance to the sensing material 308. In one embodiment, the sensor system controller 316 may select one of the circuits 330A-E at a time to change the impedance of the electrical stimuli applied to the sensing material 308 based on which of the plural circuits is selected. In another embodiment, the sensor system controller 316 may select two or more of the circuits 330A-E at a time to change the impedance of the sensing element 340 based on which of the plural circuits are selected to be open and/or closed. The circuits 330A-E may be selectively changed by the sensor system controller 316 to change the impedance or range of impedances to apply to the sensing material 308.

Figure 6:
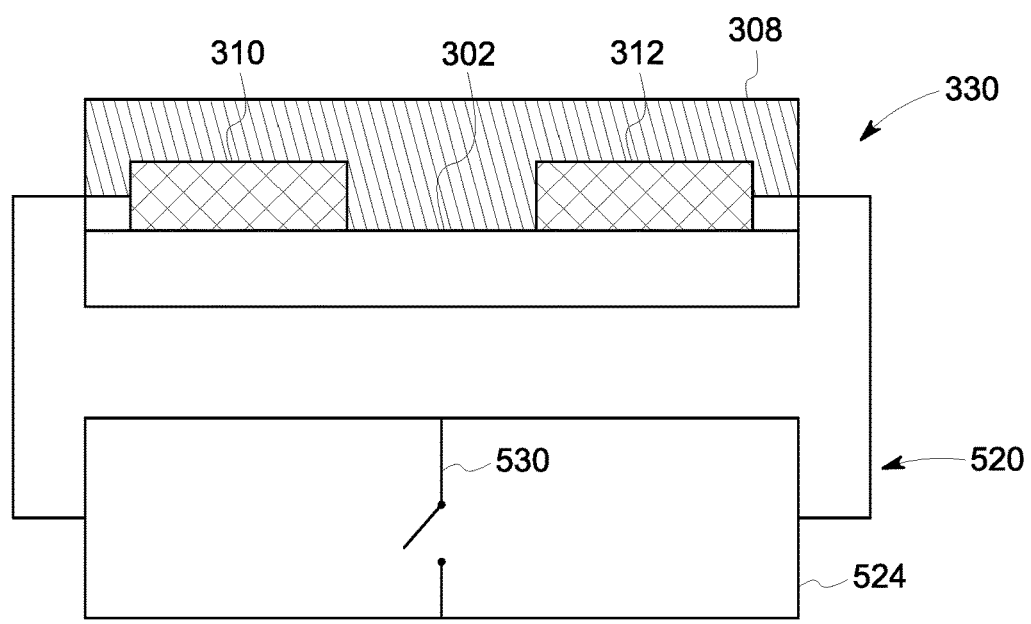
FIG. 6 illustrates a modifier assembly in accordance with one embodiment.

FIG. 6 illustrates an alternative embodiment of a modifier assembly 520 in accordance with one embodiment. The modifier assembly 520 includes a bank of circuits 524 having a single circuit 530. The circuit 530 is a variable circuit or variable device that can change the impedance of the sensing element 340. For example, the sensor system controller 316 may direct the variable circuit 530 to apply the electrical stimuli having a first impedance to the sensing material 308, and may subsequently direct the variable circuit 530 to apply the electrical stimuli having a different, second impedance to the sensing material 308. The modifier assembly 520 changes the impedance of the sensing element 340 without changing the electrical excitation frequency of the electrical stimuli applied to the sensing electrodes 310, 312 via the impedance system 314. The variable circuit 530 has a single electrical stimuli output that is directed to the electrodes 310, 312 and is not directed to a multiplexer to combine plural signals into a single output. In alternative embodiments, the modifier assembly may have any alternative configuration, one or more circuits, the multiplexer, or any combination therein.

The sensor system controller 316 can also direct the heater controller 306 on what voltage or power to apply to heating elements 304 or to what temperature to bring the heating elements 304. In one or more embodiments, the multivariable gas sensor 114 operates at a temperature of at least 50° above an ambient temperature. Optionally, the sensor 114 may operate at a temperature greater than and/or less than 50° above and/or below the ambient temperature.

The sensor system controller 316 dynamically directs the modifier assembly 320 to change the impedance of the sensing element 340 based on the different types of sensing materials 308. The sensor system controller 316 receives an electrical signal (e.g., a first electrical signal) from the sensing element 340 via the resistance detector system 332 that is representative of a resistance response of the sensing material 308 during exposure of the sensing material to the electrical stimuli. The sensor system controller 316 also receives another electrical signal (e.g., a second electrical signal) from the sensing element 340 via the impedance system 314 that is representative of an impedance of the sensing element 340 during exposure of the sensing material to the electrical stimuli. The sensor system controller 316 may direct the modifier assembly to change the electrical impedance of the sensing element 340 based on a linearity of the first electrical signal representative of the resistance response of the sensing material 308. In alternative embodiments, the sensor system controller 316 may direct the modifier assembly 320 to change the impedance of the sensing element 340 based on another response of the sensing material 308 or for any alternative reason.

Figure 7A:
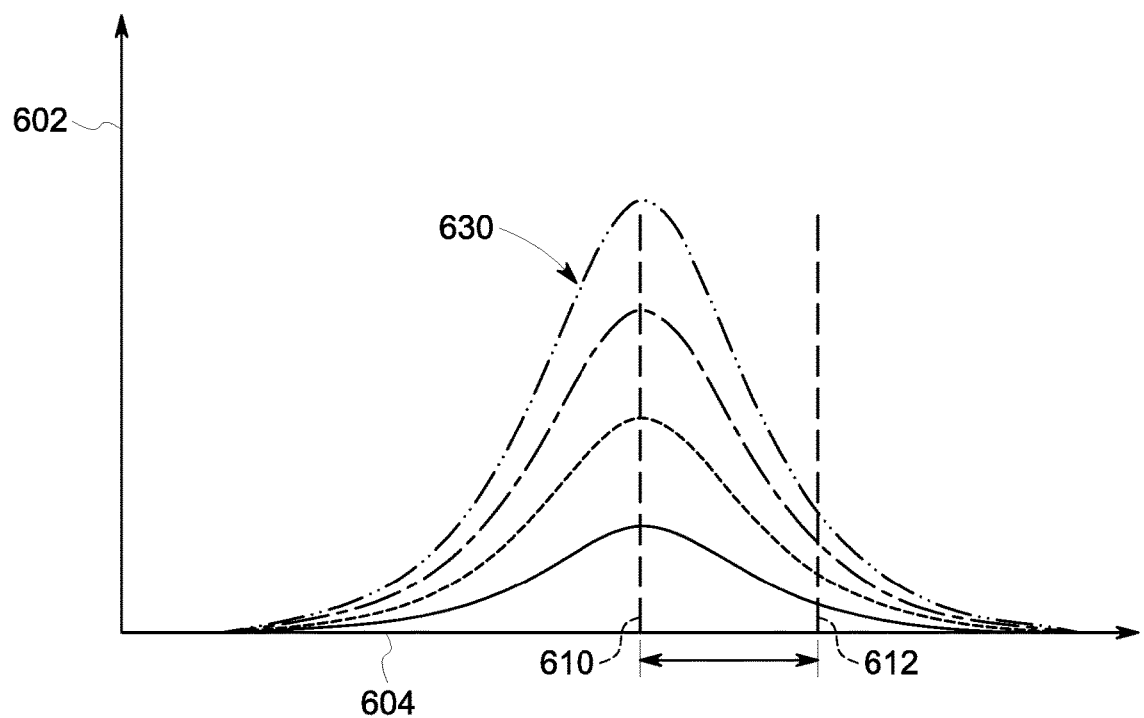
FIG. 7A illustrates a graphical illustration of scanning different regions of a dispersion profile of a sensing material in accordance with one embodiment.

FIG. 7A illustrates a graphical illustration of scanning different regions of a dispersion profile of the sensing material 308 in accordance with one embodiment. A vertical axis 602 may represent a magnitude of plural electrical signal responses 630 of the sensing material 308 and a horizontal axis 604 may represent frequency. In known sensor systems, a sensitivity of the sensing element 340 is controlled by switching between different frequencies. A controller (not shown) may direct the impedance system 314 to capture the dispersion profile of the sensing material 308 by running plural scans or tests and applying electrical stimuli to the sensing material 308 at plural different frequencies. For example, the controller may run a first scan at a first frequency 610 to capture the responses by the sensing material 308 at the first frequency, and may subsequently run a second scan at a second frequency 612 to capture the responses by the sensing material 308 at the second frequency. The controller may continue to scan at different frequencies, or step across the frequency spectrum, until the dispersion profile of the sensing material 308 is understood, captured, or the like.

Figure 7B:
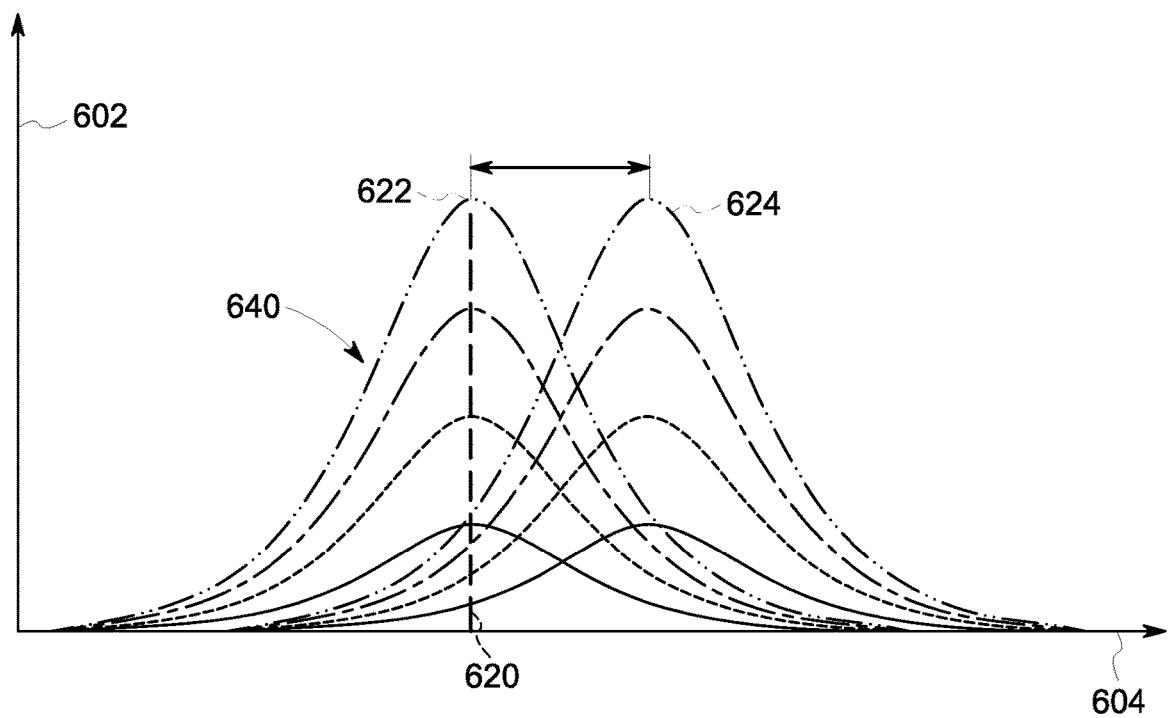
FIG. 7B illustrates a graphical illustration of controlling a peak frequency position in accordance with one embodiment.

FIG. 7B illustrates an alternative embodiment of a graphical illustration of controlling a peak frequency position. The vertical axis 602 may represent a magnitude of plural electrical signal responses 640 of the sensing material 308 and the horizontal axis 604 may represent frequency. Instead of changing the frequency of the electrical stimuli to scan across a dispersion of the signal responses 630, as illustrated in FIG. 7A, the sensor system controller 316 directs the modifier assembly 320 to operate to move a peak position of the electrical signal responses 640 from a first peak position 622 to a different, second peak position 624 by changing the impedance of the sensing element. For example, instead of stepping across the frequency spectrum, a frequency 620, such as the electrical excitation frequency, remains constant, and the modifier assembly 320, controlled via the sensor system controller 316, changes or moves the peak position of the electrical signal responses 640. The spectrum of the signal responses 640 moves from the first peak position 622 to the second peak position 624 by the modifier assembly 320 changing the impedance of the sensing element 340. The sensing element 340 may have a first impedance controlled by the modifier assembly that results in the first peak position 622 of the dispersion profile of the sensor responses. The sensor responses are moved from the first peak position 622 to the second peak position 624 by the modifier assembly 320 changing the impedance of the sensing element 340.

Switching between different frequencies, as illustrated in FIG. 7A, to scan the dispersion profile of the sensing material responses decreases or slows the response time of the sensor 114. Alternatively, controlling the position of the peak frequency response by controlling the modifier assembly 320 to change the impedance of the sensing element 340 while the frequency remains constant or substantially constant improves or speeds up the response time of the sensor 114. Controlling the modifier assembly 320 to change the impedance of the sensing element 340 changes the position of the peak frequency responses.

Figure 8:
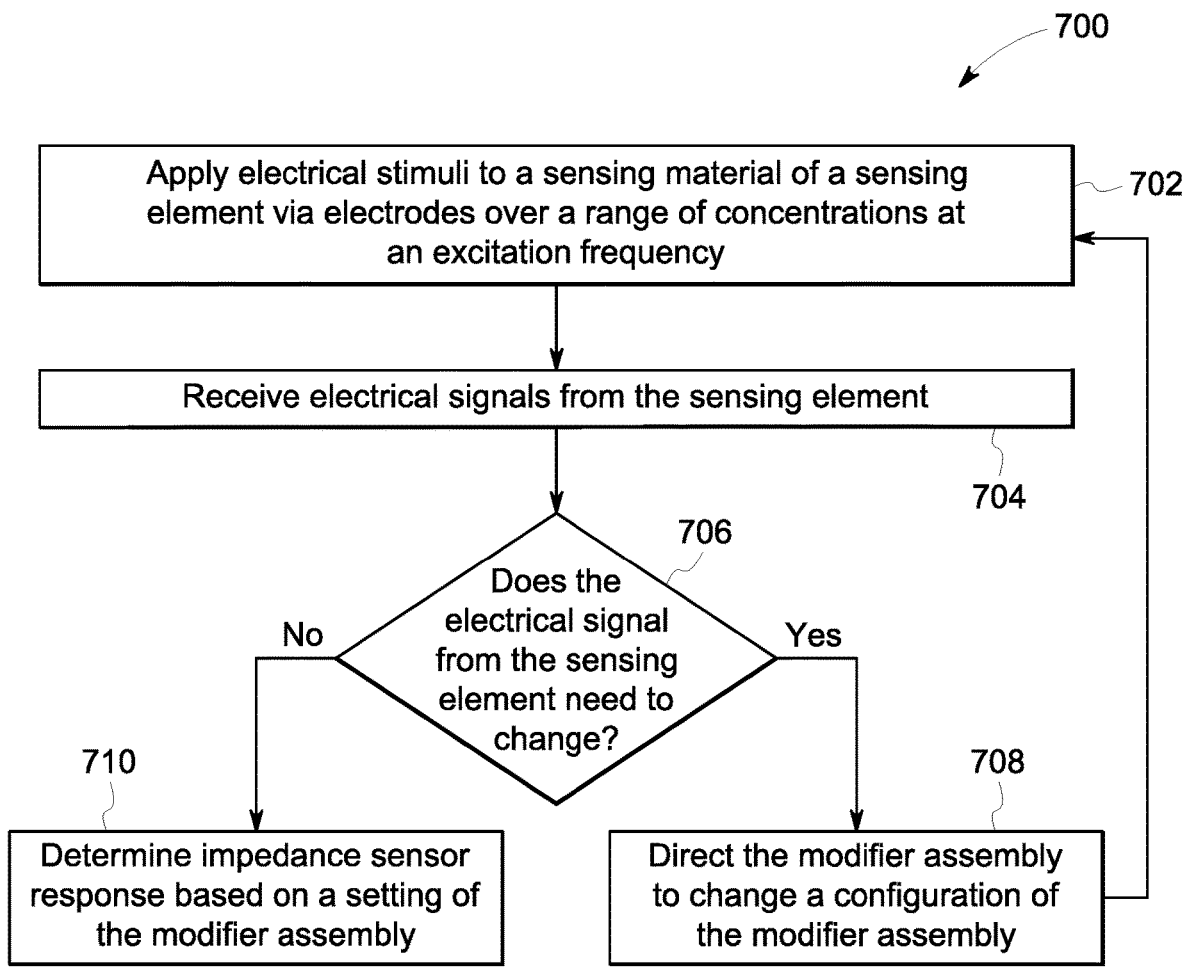
FIG. 8 illustrates a flowchart of one embodiment of a method for sensing one or more analyte gases of interest in accordance with one embodiment.

FIG. 8 illustrates a flowchart of one embodiment of a method 700 for sensing one or more analyte gases of interest in accordance with one embodiment. The method 700 can represent the operations performed by the sensor system 100 and the sensing element 340 described herein, or optionally can represent the operations performed by another sensing system and/or another gas sensor. For example, the method 700 can represent operations performed by the system 100 and/or the sensing element 340 under direction of one or more software applications, or optionally can represent an algorithm useful for writing such software applications.

At 702, the sensing electrodes 310, 312 apply a first electrical stimuli at a single electrical excitation frequency to the sensing material 308 of the sensing element 340 to detect and obtain one or more electrical signals. In one or more embodiments, the first electrical stimuli can be done or applied to the sensing material 308 at a first electrical excitation frequency of zero or about zero. For example, the first electrical excitation frequency may be direct current (DC) excitation. A first electrical signal may represent a resistance or a resistance response measurement of the sensing material 308 during exposure of the sensing material 308 to the first electrical stimuli over a range of concentrations of one or more analytes of interest. A second electrical signal may represent an electrical impedance or impedance response of the sensing element 340. In one embodiment, the electrodes 310, 312 may apply electrical stimuli at a single excitation frequency of about 400 kHz, however the electrical stimuli may be applied at a different excitation frequency such as at 1 Hz, 10 Hz, 100 Hz, 1 kHz, 10 kHz, 100 kHz, 1 MHz, 10 MHz, or 100 MHz, 1 GHz, or any other frequency. The sensing material 308 may be exposed to varying ranges of concentrations of hydrogen (H2), methane (CH4), ethane (C2H6), carbon monoxide (CO), or any alternative analyte gas or gases. At 704, the sensing system controller 316 receives one or more first electrical signals representative of resistance responses of the sensing material 308 via the resistance detector system 332. The sensing system controller 316 may also receive one or more second electrical signals representative of an impedance response of the sensing element 340 via the impedance system 314 in addition to or in place of the electrical signals representative of the resistance responses of the sensing material 308. Optionally, the sensing system controller 316 may receive electrical signals representative of alternative properties of the sensing material 308.

Figure 9:
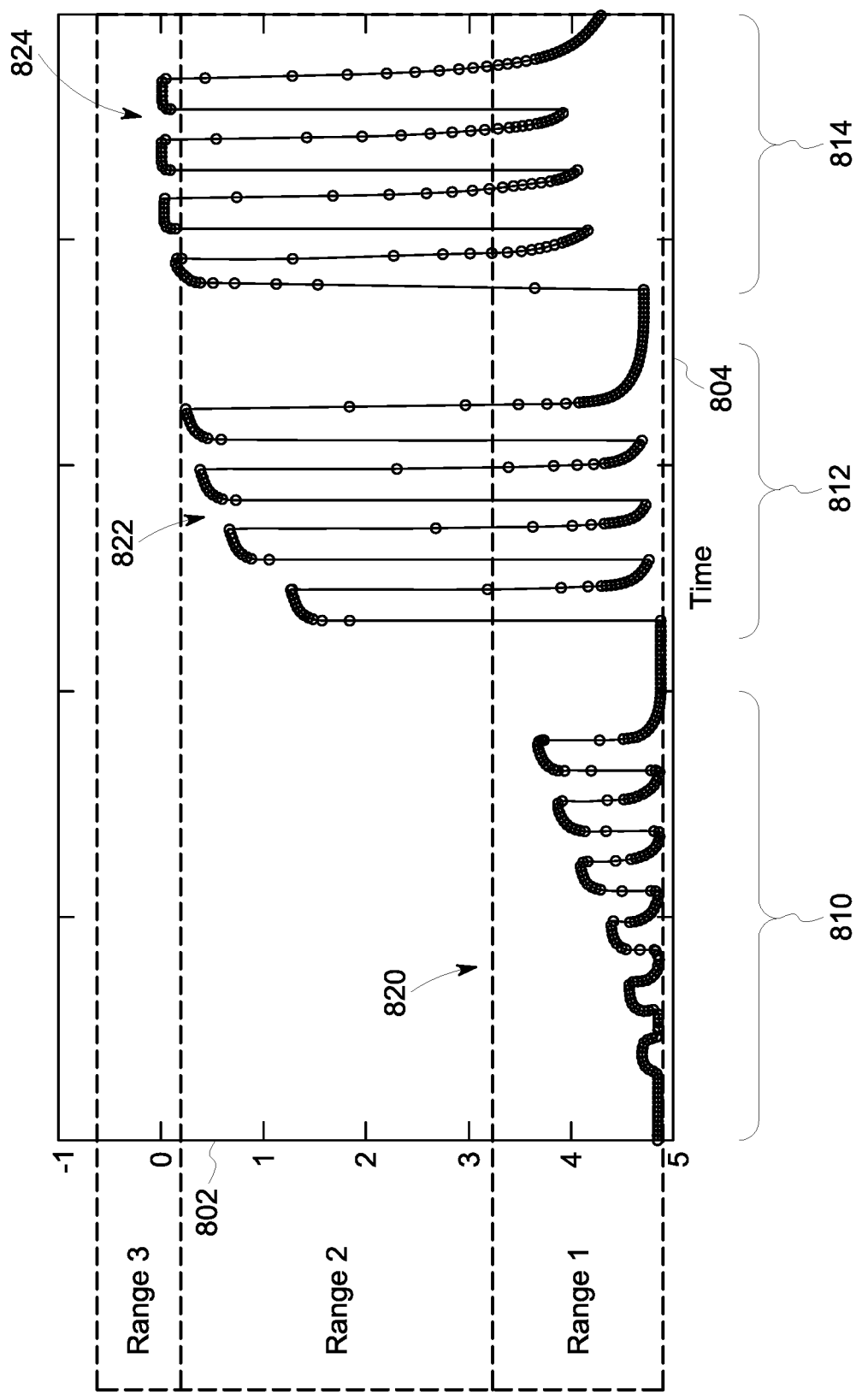
FIG. 9 illustrates a graphical illustration of electrical signals representative of resistance responses of a sensing material in accordance with one embodiment.

FIG. 9 illustrates a graphical illustration of electrical signals representative of the resistance or resistance responses of the sensing material 308 over a range of concentrations of hydrogen gas. The electrical signals are shown alongside a vertical axis 802 representative of the magnitudes of the resistance and a horizontal axis 804 representative of time. Resistance responses across a spectrum of concentrations of an analyte of interest can be also viewed as the impedance response of a sensor system across a spectrum of concentrations of an analyte of interest when the operating frequency is small and/or is approaching zero. The sensor is exposed to different concentrations of an analyte of interest (e.g., hydrogen) at a single excitation frequency (e.g., 400 kHz). The electrical signals include a dynamic range of measurements across a range of gas concentrations at which the sensor provides readings. In the illustrated embodiment, the electrical signal resistance responses are separated into a first range 810, a second range 812, and a third range 814. In one embodiment, the first range 810 includes resistance responses 820 of the sensor exposed to concentrations of H2 such as 0.9, 2.4, 4.7, 9.4, 14.1, and 18.8 parts per million (ppm). The second range 812 includes resistance responses 822 of the sensor exposed to concentrations of H2 such as 235.3, 470.6, 705.9, and 941.2 ppm. The third range 814 includes resistance responses 824 of the sensor exposed to concentrations of H2 such as 1471, 2941, 4412, and 5882 ppm. As illustrated in FIG. 9, the linearity of the resistance responses 820 for the first range 810 is better (e.g., more linear) than a linearity of the resistance responses 822 of the second range 812 and the resistance responses 824 of the third range 814. The linearity of the resistance responses 822, 824 degrades for the second and third ranges 812, 814 relative to the linearity of the resistance responses 820 for the first range 810. The degradation of the linearity of the resistance responses 822, 824 indicates a reduced sensitivity of the sensing element 340.

Returning to FIG. 8, at 706, a decision is made if the first electrical signal from the sensing element 340 that is representative of the resistance of the sensing material 308 needs to change. For example, the electrical signal may be changed by changing the electrical impedance of the sensing element 340. Changing the impedance of the sensing element 340 changes a linearity of the first electrical signal responses received from the sensing element 340. If the first electrical signal does not need to change, the flow of the method proceeds to 710. Alternatively, if the first electrical signal does need to change, the flow of the method proceeds to 708.

Figure 10:
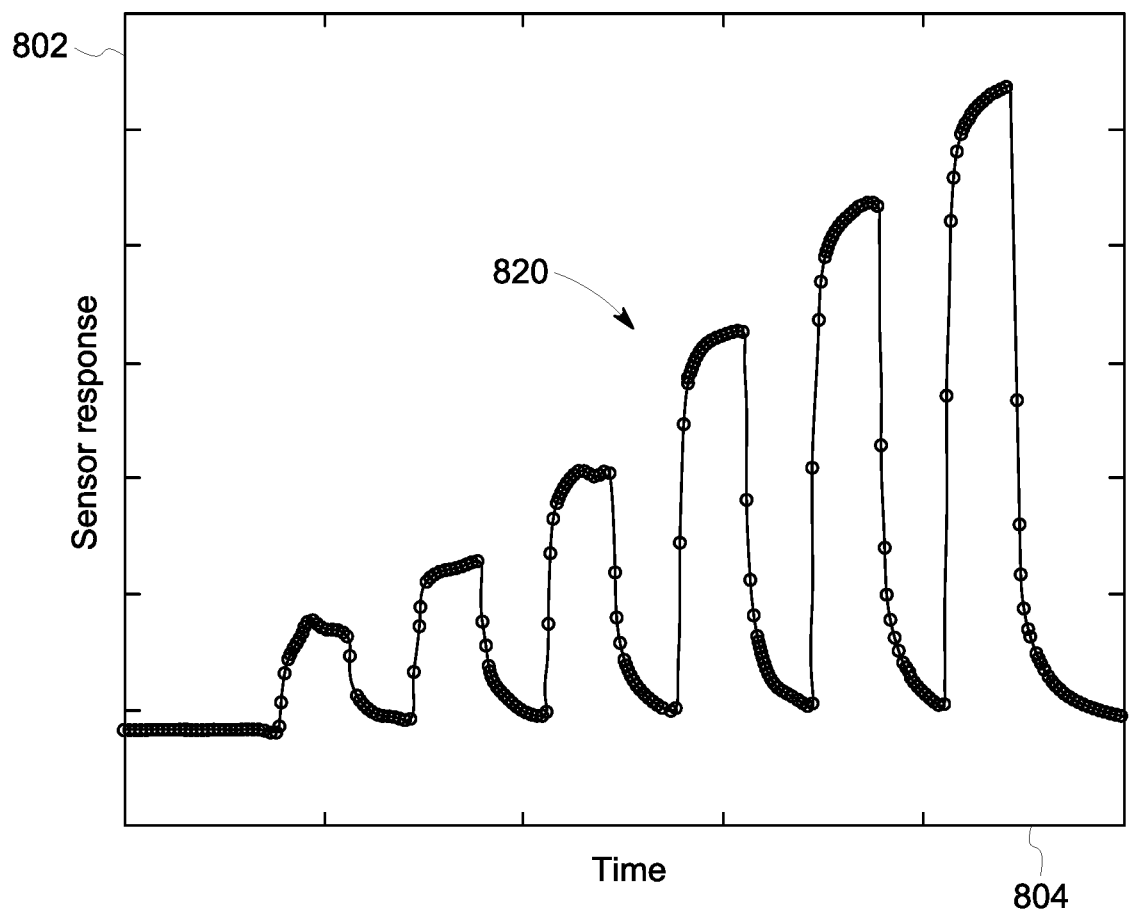
FIG. 10 illustrates a graphical illustration of electrical signals representative of resistance responses of a sensing material across a first range of concentration of an analyte of interest in accordance with one embodiment.

FIG. 10 illustrates a graphical illustration of electrical signals representative of resistance responses of the sensing material 308 across the first range 810 of concentration of an analyte of interest (e.g., H2) in accordance with one embodiment. As illustrated in FIG. 10, when the concentration of the analyte of interest (e.g., H2) are relatively low (0.9, 2.4, 4.7, 9.4, 14.1, and 18.8 ppm), the resistance responses 820 of the first range 810 are substantially linear. Returning to FIG. 8, at 706, the electrical signal from the sensing element 340 does not need to change. Flow of the method proceeds to 710, and a second electrical signal representative of an impedance sensor response is determined based on a setting of the modifier assembly 320. The second electrical signal representative of the impedance response can be determined by the impedance system 314 and transmitted to the sensor system controller 316, or may be determined by the sensor system controller 316. In the illustrated example of FIG. 10, the modifier assembly 320 does not change the impedance response.

Figure 11A:
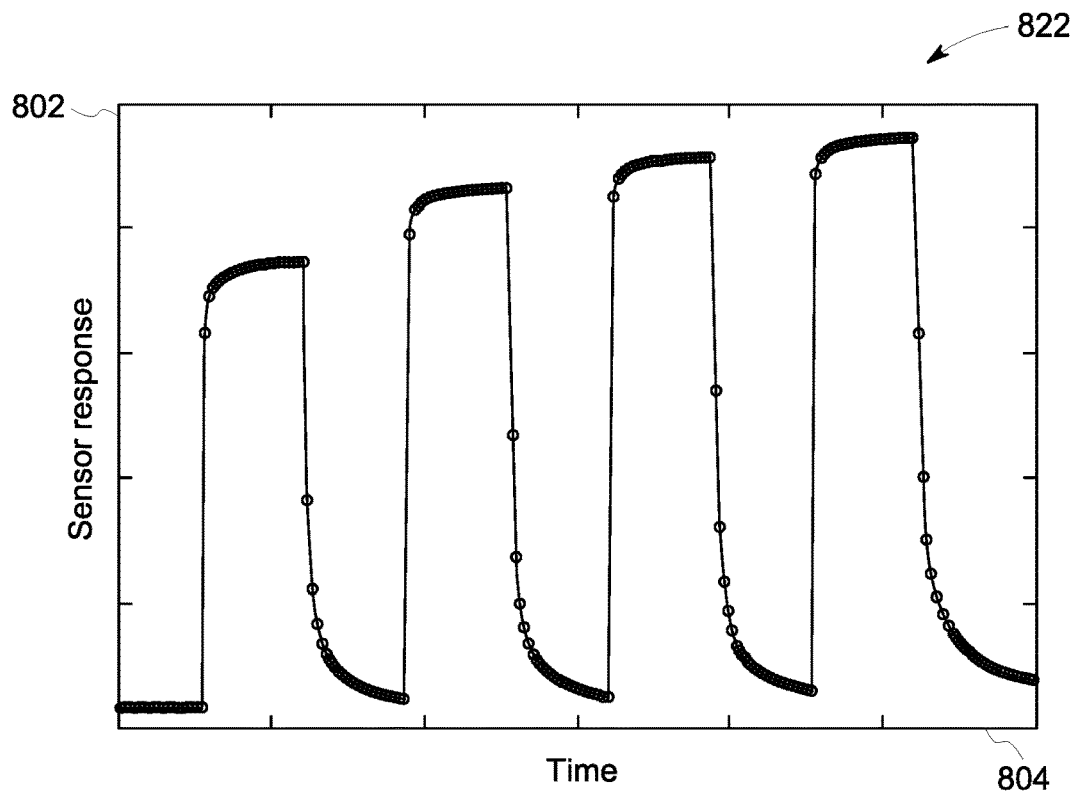
FIG. 11A illustrates a graphical illustration of electrical signals representative of resistance responses of a sensing material across a second range of concentration of an analyte of interest in accordance with one embodiment.

FIG. 11A illustrates a graphical illustration of the first electrical signals representative of resistance responses of the sensing material 308 across the second range 812 of concentration of an analyte of interest in accordance with one embodiment. As the concentration of the analyte of interest (e.g., H2) increases (235.3, 470.6, 705.9, and 941.2 ppm), the linearity of the resistance responses 822 degrades. The degraded linearity of the resistance responses 822 indicates reduced sensitive of the sensing element 340 at the increase concentrations of the analyte of interest.

Returning to FIG. 8, at 706, the first electrical signal from the sensing element 340 does need to change. At 708, the sensor system controller 316 directs the modifier assembly to change a configuration of the modifier assembly to change an impedance of the sensing element 340. The configuration of the modifier assembly may be changed based on the impedance response of the sensing material 308 and/or the resistance response of the sensing material 308. Controlling the modifier assembly 320 to change the impedance of the sensing element 340 dynamically changes the sensitivity of the sensing element 340. The sensor system controller 316 may direct one or more of the circuits 330 of the modifier assembly 320 (shown in FIG. 5) to close (e.g., to electrically couple with the sensing element 340) and direct the other of the circuits 330 to open (e.g., to electrically disconnect from the sensing element 340) at a time to change the impedance of the sensing element 340. Alternatively, the sensor system controller 316 may direct the variable circuit 530 (shown in FIG. 6) to change the impedance of the sensing element from a first impedance to a different, second impedance. In one embodiment, the sensor system controller 316 may direct the first circuit 330A, that may be a 100 picofarad (pF) capacitor, capacitive element, or any passive electrical components, to close, and may direct the other circuits 330B-E to open.

Figure 11B:
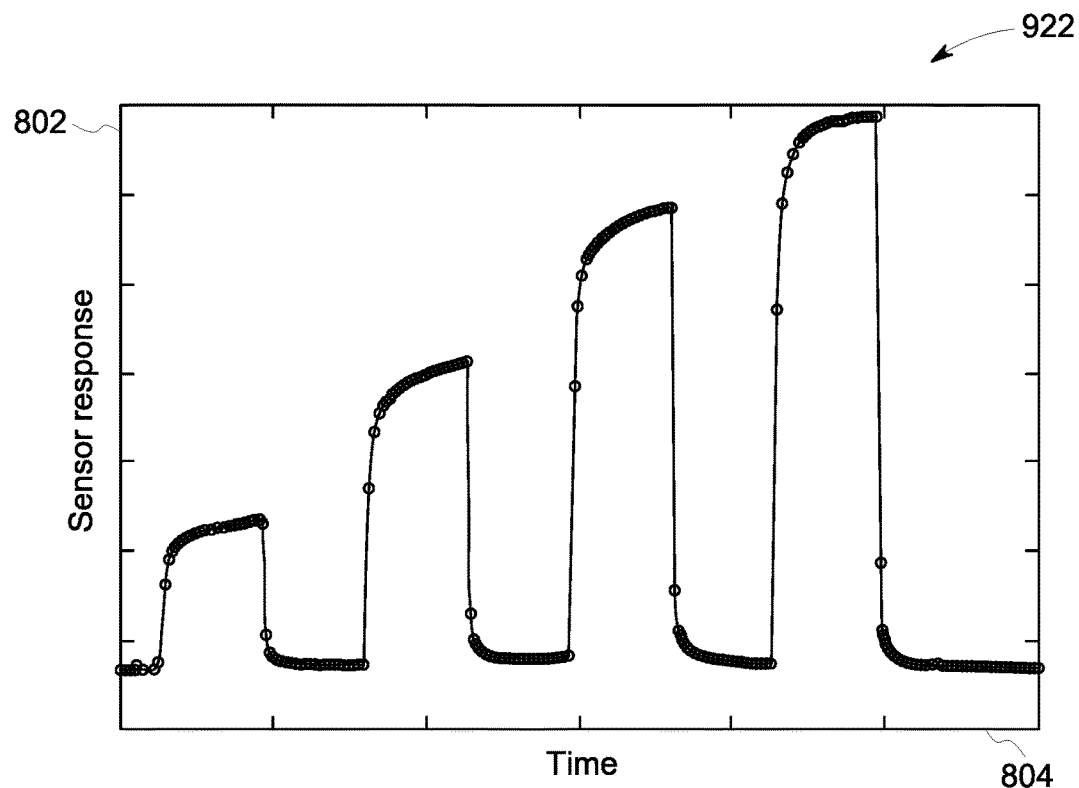
FIG. 11B illustrates a graphical illustration of electrical signals representative of impedance responses of a sensing material across a second range of concentration of an analyte of interest after a modifier assembly changes an impedance of an electrical stimuli applied to the sensing material in accordance with one embodiment.

Flow of the method returns to 702, and a second electrical stimuli is applied to the sensing material 308 via the sensing electrodes 310, 312. FIG. 11B illustrates a graphical illustration of electrical signals representative of impedance responses of the sensing material 308 across the second range 812 of concentration of an analyte of interest after the modifier assembly 320 changes the impedance of the sensing element 340 and a second electrical stimuli is applied to the sensing material 308 at the same electrical excitation frequency in accordance with one embodiment. The sensor system controller 316 receives the electrical signals representative of new impedance responses 922 from the sensing element 340. Changing the impedance of the sensing element 340 by controlling the modifier assembly 320 changes a linearity of the electrical signals from the resistance responses 822 illustrated in FIG. 11A to the new impedance responses 922 illustrated in FIG. 11B. For example, the new impedance responses 922 have increased or improved linearity relative to the resistance responses 822. For example, FIG. 11A illustrates a conventional response that was saturated while the selection of the modifier assembly 320 provides a desired target impedance response linearity.

The sensitivity of the sensing element 340 improves or increases (e.g., becomes more sensitive) responsive to the modifier assembly 320 changing the impedance of the sensing element 340. The sensitivity of the sensing element 340 improves independent of the concentration of the analyte of interest and without changing the frequency of the electrical stimuli applied to the sensing material 308. For example, the one or more processors of the sensor system controller 316 may control the modifier assembly 320 based on the resistance of the sensing material 308 and independent of a concentration of at least one analyte gas of interest. Additionally or alternatively, the sensitivity of the sensing element 340 may improve dependent on the concentration of the analyte of interest. For example, the one or more processors may control the modifier assembly 320 based on the resistance of the sensing material 308 and dependent on a concentration of the analyte of interest.

Figure 12A:
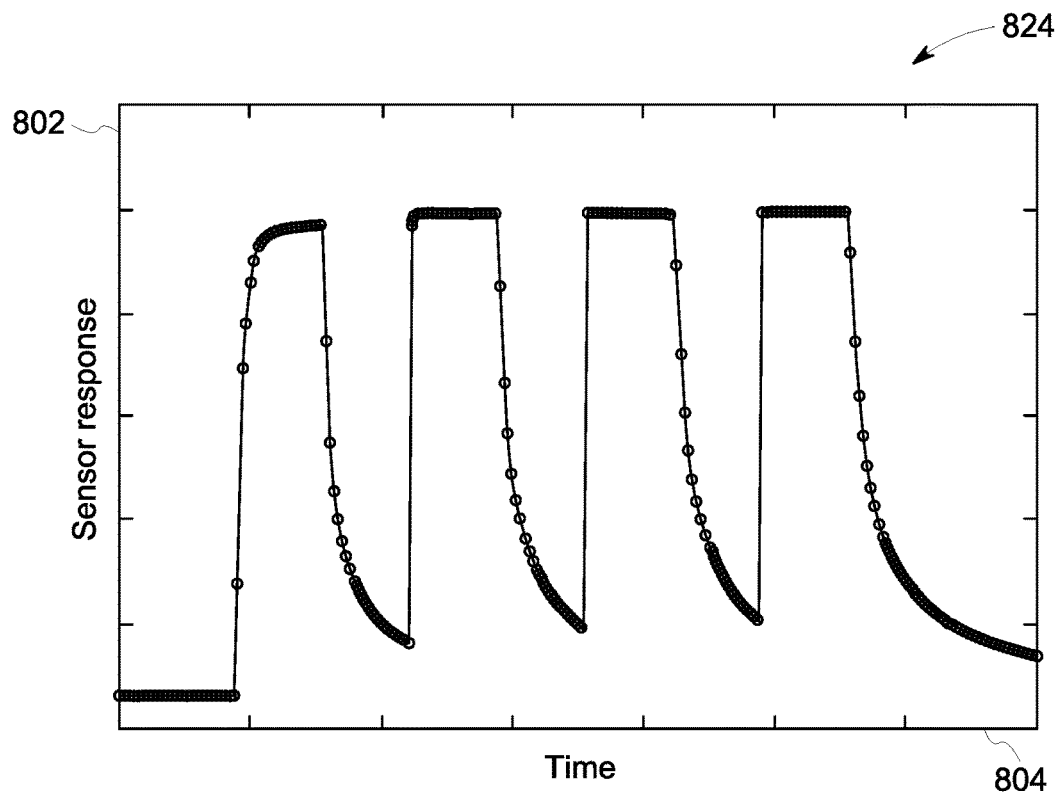
FIG. 12A illustrates a graphical illustration of electrical signals representative of resistance responses of a sensing material across a third range of concentration of an analyte of interest in accordance with one embodiment.
Figure 12B:
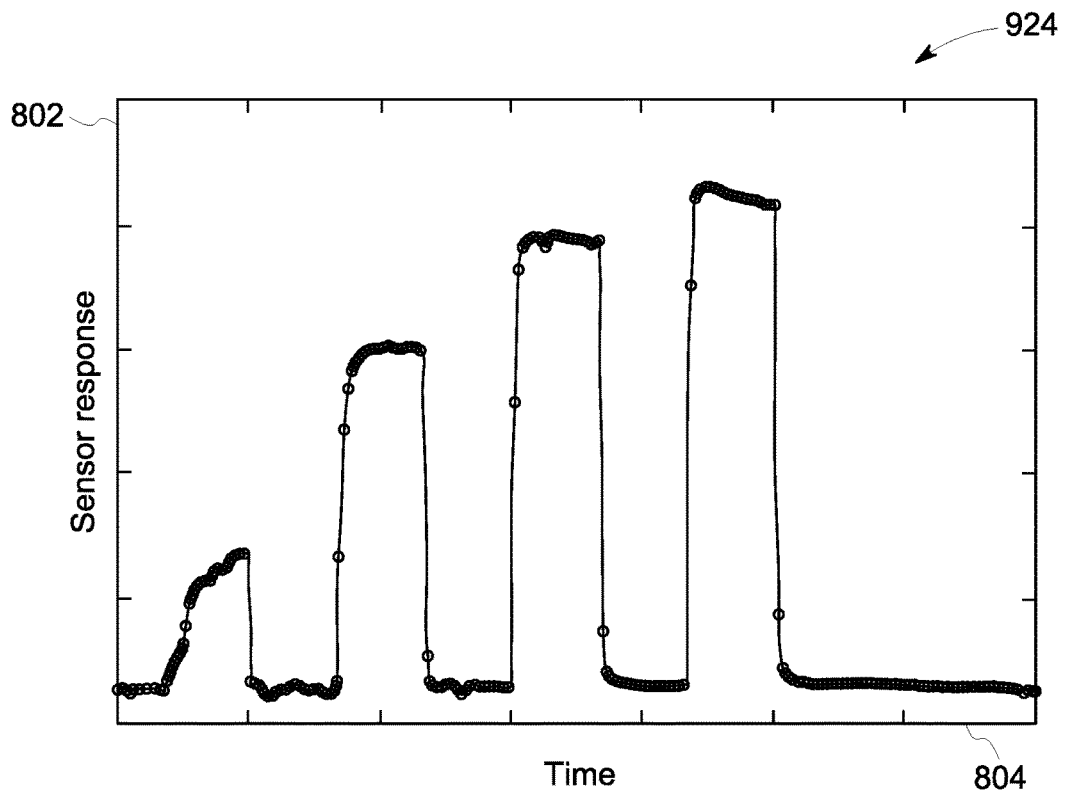
FIG. 12B illustrates a graphical illustration of electrical signals representative of impedance responses of a sensing material across a third range of concentration of an analyte of interest after a modifier assembly changes an impedance of an electrical stimuli applied to the sensing material in accordance with one embodiment.

FIGS. 12A and 12B illustrate another example of changing a linearity of an electrical signal received from the sensing element 340 by changing the impedance of the electrical stimuli applied to the sensing electrodes 310, 312. FIG. 12A illustrates a graphical illustration of electrical signals representative of resistance responses of the sensing material 308 across the third range 814 of concentration of an analyte of interest in accordance with one embodiment. As the concentration of the analyte of interest (e.g., H2) increases (1471, 2941, 4412, and 5882 ppm) the linearity of the resistance responses 824 degrades. The sensor system controller 316 may direct one or more of the circuits 330 (shown in FIG. 5) to close (e.g., to electrically couple with the sensing element 340) and direct the other of the circuits 330 to open (e.g., to electrically disconnect from the sensing element 340) at a time to change the impedance of the sensing element 340. Alternatively, the sensor system controller 316 may direct the variable circuit 530 (shown in FIG. 6) to change the impedance from a first impedance value to a second impedance value. In one embodiment, the sensor system controller 316 may direct the second circuit 330B, that may be a 10 nanofarad (nF) capacitor, capacitive element, or any passive electrical components, to close, and may direct the other circuits 330A, 330C-E to open.

A second electrical stimuli having the different impedance and the same or common excitation frequency is applied to the sensing material 308 via the sensing electrodes 310, 312. FIG. 12B illustrates a graphical illustration of electrical signals representative of impedance responses of the sensing material 308 across the third range 814 of concentration of the analyte of interest after the modifier assembly 320 changes the impedance of sensing element 340 in accordance with one embodiment. The sensor system controller 316 receives the electrical signals representative of new impedance responses 924 from the sensing element 340. Changing the impedance of the sensing element 340 by controlling the modifier assembly 320 changes a linearity of the electrical signals from the resistance responses 824 illustrated in FIG. 12A to the new impedance responses 924 illustrated in FIG. 12B. For example, the new impedance responses 924 have increased or improved linearity relative to the resistance responses 824 without changing the excitation frequency of the electrical stimuli.

The sensitivity of the sensing element 340 improves or increases (e.g., becomes more sensitive) responsive to the modifier assembly 320 changing the impedance of the sensing element 340. For example, the sensitivity of the sensing element 340 improves independent of the concentration of the analyte of interest and without changing the frequency of the electrical stimuli applied to the sensing material 308. Flow of the method 700 may proceed to 710 if a linearity of the resistance responses is improved to or reaches a predetermined threshold. Optionally, the flow of the method 700 may continue to 702 to repeat the method until the linearity of the resistance responses reaches the predetermined threshold, a predetermined acceptable response, or the like. For example, the method may repeat and the sensor system controller 316 may direct a second circuit 330B and/or a third circuit 330C of the modifier assembly 320 to open and/or close in addition to or in place of or in addition to a first circuit 330A opening and/or closing to change the impedance of the sensing element 340, and a third electrical stimuli may be applied to the sensing material 308 at the electrical excitation frequency. At 710, the impedance system 314 determines the impedance response based on the setting of the modifier assembly 320. The sensor system controller 316 may receive the electrical signal representative of the impedance response via the impedance system 314, and may receive the electrical signal representative of the resistance response via the resistance detector system 332.

As illustrated in FIGS. 11B and 12B, the modifier assembly improves a sensitivity of the sensor over a dynamic range of measurements by changing or improving a linearity of the resistance responses independent of the concentration of the analyte of interest and without changing a frequency of the electrical stimuli applied to the sensing material 308. For example, the single sensor 114 measures a broad range of concentrations of the analyte of interest at a single or discrete frequency with improved accuracy of the sensor responses relative to a sensor that is devoid a modifier assembly, or relative to plural sensors. Optionally, the sensor system controller 316 may change or improve a linearity of the resistance responses dependent on the concentration of the analyte of interest and without changing a frequency of the electrical stimuli applied to the sensing material 308.

In one or more embodiments, the resistance responses and/or the impedance responses of the sensing material may include a baseline that may be the sensor response in the absence of a gas or gases of interest but in the presence of a clean carrier gas. Additionally, the resistance and/or impedance responses may include a response drift and/or a response baseline drift that may be an uncontrolled change in the sensor response (e.g., such as a slow baseline change or a change that occurs over a period of time) that can either increase or decrease sensor response values. In one or more embodiments, the sensor system controller 316 can apply a baseline correction to determine a difference between a response drift and the resistance and/or impedance responses. The sensor system controller 316 may subsequently use subtraction or any other mathematical manipulation to determine a difference between the response drift and the baseline response of the resistance and/or impedance responses. The impedance responses can be adjusted based on the values of the modifier assembly.

In one or more embodiments of the subject matter described herein, a sensor system includes a sensing element that includes a sensing material and electrodes configured to apply a first electrical stimuli to the sensing material at an electrical excitation frequency, a modifier assembly including one or more circuits configured to change an electrical impedance of the sensing element, and one or more processors configured to control the modifier assembly. Responsive to exposure of gas to the sensing element, the one or more processors change a linearity of a first electrical signal received from the sensing element by changing the electrical impedance of the sensing element and applying a second electrical stimuli to the sensing material at the electrical excitation frequency.

Optionally, the first electrical signal is representative of a resistance of the sensing material during exposure of the sensing material to the first electrical stimuli.

Optionally, the one or more processors are configured to control the modifier assembly based on the resistance of the sensing element responsive to the exposure of the gas to the sensing element.

Optionally, the modifier assembly includes a variable circuit configured to change the electrical impedance of the sensing element.

Optionally, the modifier assembly includes plural circuits. A first circuit of the plural circuits is configured to change the electrical impedance to a first impedance and a second circuit of the plural circuits is configured to change the electrical impedance to a different, second impedance.

Optionally, the modifier assembly includes a multiplexer coupled with the plural circuits.

Optionally, the one or more processors are configured to select one of the plural circuits at a time to change the electrical impedance of the sensing element based on which of the plural circuits are selected.

Optionally, the one or more processors are configured to receive a second electrical signal from the sensing element that is representative of the electrical impedance of the sensing element.

Optionally, the system also includes an impedance system operably coupled with the sensing element and the one or more processors. The one or more processors are configured to receive the second electrical signal that is representative of the electrical impedance of the sensing element from the impedance system.

Optionally, the impedance system is configured to direct the electrodes to apply the second electrical stimuli to the sensing material at the electrical excitation frequency.

Optionally, the sensing material is configured to be in contact with at least one analyte gas.

Optionally, the one or more processors are configured to control the modifier assembly based on a resistance of the sensing material and independent of a concentration of the at least one analyte gas.

Optionally, the one or more processors are configured to control the modifier assembly based on a resistance of the sensing material and dependent on a concentration of the at least one analyte gas.

In one or more embodiments of the subject matter described herein, a method includes applying a first electrical stimuli at an electrical excitation frequency to a sensing material of a sensing element via electrodes. A first electrical signal is received from the sensing element that is representative of a resistance of the sensing material during exposure of the sensing material to the first electrical stimuli. A linearity of the first electrical signal received from the sensing element is changed by changing an electrical impedance of the sensing element and applying a second electrical stimuli at the electrical excitation frequency to the sensing material.

Optionally, the electrical impedance of the sensing element is changed with a modifier assembly including a variable circuit.

Optionally, the method also includes changing the electrical impedance of the sensing element with a modifier assembly including plural circuits. A first circuit of the plural circuits is configured to change the electrical impedance to a first impedance and a second circuit of the plural circuits is configured to change the electrical impedance to a different, second impedance.

Optionally, the modifier assembly includes a multiplexer coupled with the plural circuits.

Optionally, the method also includes selecting one of the plural circuits at a time to chance the electrical impedance of the sensing element based on which of the plural circuits are selected.

Optionally, the method also includes controlling a modifier assembly based on the resistance of the sensing material.

Optionally, the method also includes receiving a second electrical signal from the sensing element that is representative of the electrical impedance of the sensing material.

Optionally, the sensing material is configured to be in contact with at least one analyte gas.

Optionally, changing the linearity of the first electrical signal received from the sensing element by changing the electrical impedance of the sensing element is based on the resistance of the sensing material and is independent of a concentration of the at least one analyte gas.

Optionally, changing the linearity of the first electrical signal received from the sensing element by changing the electrical impedance of the sensing element is based on the resistance of the sensing material and is dependent on a concentration of the at least one analyte gas.

Optionally, the first electrical stimuli is applied at a first electrical excitation frequency. The first electrical excitation frequency is a zero frequency.

In one or more embodiments of the subject matter described herein, a method includes applying electrical stimuli at a single electrical excitation frequency to a sensing material of a sensing element via electrodes. A first electrical signal is received from the sensing element that is representative of a resistance response of the sensing material during exposure of the sensing material to the electrical stimuli. A second electrical signal is received from the sensing element that is representative of an impedance response of the sensing material at the single electrical excitation frequency. A linearity of the first electrical signal received from the sensing element is changes by changing a configuration of a modifier assembly of the sensing element to change an impedance of the sensing element based on one or more of the impedance response of the sensing material or the resistance response of the sensing material.

In one or more embodiments of the subject matter described herein, a method includes applying electrical stimuli at two or more electrical excitation frequencies to a sensing material of a sensing element via electrodes. Electrical signals are received from the sensing element during exposure of the sensing material to the electrical stimuli. A first electrical signal is representative of a resistance response of the sensing material during exposure of the sensing material to the electrical excitation frequencies, and a second electrical signal is representative of an impedance response of the sensing material during exposure of the sensing material to the electrical excitation frequencies. A linearity of one or more of the electrical signals received from the sensing element is changed by changing a configuration of a modifier assembly of the sensing element to change an impedance of the sensing element based on one or more of the resistance response of the sensing material or the impedance response of the sensing material.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

As used herein, terms such as "operably connected," "operatively connected," "operably coupled," "operatively coupled," "operationally contacted," "operational contact" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system comprising:
a sensing element that includes a sensing material and electrodes configured to apply a first electrical stimuli to the sensing material at an electrical excitation frequency, wherein the sensing material is configured to be in contact with at least one analyte gas;
a modifier assembly comprising one or more circuits configured to change an electrical impedance of the sensing element; and
one or more processors configured to control the modifier assembly, wherein, responsive to exposure of gas to the sensing element, the one or more processors are configured to change a linearity of a first electrical signal received from the sensing element by changing the electrical impedance of the sensing element and applying a second electrical stimuli to the sensing material at the electrical excitation frequency, wherein changing the linearity of the first electrical signal received from the sensing element by changing the electrical impedance of the sensing element is based on an electrical impedance of the sensing material and is dependent on a concentration of the at least one analyte gas.

2. The sensor system of claim 1, wherein the first electrical signal is representative of the electrical impedance of the sensing element during exposure of the sensing material to the first electrical stimuli.

3. The sensor system of claim 2, wherein the one or more processors are configured to control the modifier assembly based on the electrical impedance of the sensing element responsive to the exposure of the gas to the sensing element.

4. The sensor system of claim 1, wherein the modifier assembly includes a variable circuit configured to change the electrical impedance of the sensing element at a single operation temperature.

5. The sensor system of claim 1, wherein the modifier assembly includes plural circuits, wherein a first circuit of the plural circuits is configured to change the electrical impedance to a first impedance and wherein a second circuit of the plural circuits is configured to change the electrical impedance to a different, second impedance.

6. The sensor system of claim 5, wherein the modifier assembly comprises a multiplexer coupled with the plural circuits.

7. The sensor system of claim 5, wherein the one or more processors are configured to select one of the plural circuits at a time to change the electrical impedance of the sensing element based on which of the plural circuits are selected.

8. The sensor system of claim 1, wherein the one or more processors are configured to receive a second electrical signal from the sensing element that is representative of the electrical impedance of the sensing element in response to applying the second electrical stimuli.

9. The sensor system of claim 8, further comprising an impedance system operably coupled with the sensing element and the one or more processors, wherein the one or more processors are configured to receive the second electrical signal that is representative of the electrical impedance of the sensing element from the impedance system.

10. The sensor system of claim 9, wherein the impedance system is configured to direct the electrodes to apply the second electrical stimuli to the sensing material at the electrical excitation frequency.

11. A method comprising:
applying a first electrical stimuli at an electrical excitation frequency to a sensing material of a sensing element via electrodes, wherein the sensing material is in contact with at least one analyte gas;
receiving a first electrical signal from the sensing element that is representative of an impedance of the sensing element during exposure of the sensing material to the first electrical stimuli; and
changing a linearity of the first electrical signal received from the sensing element by changing an electrical impedance of the sensing element and applying a second electrical stimuli at the electrical excitation frequency to the sensing material, wherein changing the linearity of the first electrical signal received from the sensing element by changing the electrical impedance of the sensing element is based on the electrical impedance of the sensing material and is dependent on a concentration of the at least one analyte gas.

12. The method of claim 11, further comprising changing the electrical impedance of the sensing element with a modifier assembly including a variable circuit.

13. The method of claim 11, further comprising changing the electrical impedance of the sensing element with a modifier assembly including plural circuits, wherein a first circuit of the plural circuits is configured to change the electrical impedance to a first impedance and wherein a second circuit of the plural circuits is configured to change the electrical impedance to a different, second impedance.

14. The method of claim 13, wherein the modifier assembly comprises a multiplexer coupled with the plural circuits.

15. The method of claim 13, further comprising selecting one of the plural circuits at a time to change the electrical impedance of the sensing element based on which of the plural circuits are selected.

16. The method of claim 11, further comprising controlling a modifier assembly based on the electrical impedance of the sensing element.

17. The method of claim 11, further comprising receiving a second electrical signal from the sensing element that is representative of the electrical impedance of the sensing material.

18. The method of claim 11, wherein the first electrical stimuli is applied at a first electrical excitation frequency, wherein the first electrical excitation frequency is a zero frequency.

19. A method comprising:
applying electrical stimuli at a single electrical excitation frequency to a sensing material of a sensing element via electrodes;
receiving a first electrical signal from the sensing element that is representative of a resistance response of the sensing material during exposure of the sensing material to the electrical stimuli;
receiving a second electrical signal from the sensing element that is representative of an impedance response of the sensing material at the single electrical excitation frequency; and
changing a linearity of the first electrical signal received from the sensing element by changing a configuration of a modifier assembly of the sensing element to change an impedance of the sensing element based on one or more of the impedance response of the sensing material or the resistance response of the sensing material.

20. A method comprising:
applying electrical stimuli at two or more electrical excitation frequencies to a sensing material of a sensing element via electrodes;
receiving electrical signals from the sensing element during exposure of the sensing material to the electrical stimuli, wherein a first electrical signal is representative of a resistance response of the sensing material during exposure of the sensing material to the electrical excitation frequencies, and wherein a second electrical signal is representative of an impedance response of the sensing material during exposure of the sensing material to the electrical excitation frequencies; and
changing a linearity of one or more of the electrical signals received from the sensing element by changing a configuration of a modifier assembly of the sensing element to change an impedance of the sensing element based on one or more of the resistance response of the sensing material or the impedance response of the sensing material.

* * * * *